United States Patent [19]

de Baan et al.

[11] 4,428,566
[45] Jan. 31, 1984

[54] TWO-TUBE HYDROPNEUMATIC SHOCK ABSORBER

[75] Inventors: Johannes J. de Baan; Adolf Adrian, both of Ennepetal, Fed. Rep. of Germany

[73] Assignee: August Bilstein GmbH & Co. KG, Ennepetal, Fed. Rep. of Germany

[21] Appl. No.: 323,890

[22] Filed: Nov. 23, 1981

[30] Foreign Application Priority Data

Nov. 26, 1980 [DE] Fed. Rep. of Germany ....... 3044460

[51] Int. Cl.³ .......................... F16F 9/36; B60G 15/00
[52] U.S. Cl. ................................. 267/64.15; 188/269; 188/315; 188/322.13; 188/322.16
[58] Field of Search .................. 188/314, 315, 322.13, 188/322.16, 322.17, 322.18, 322.19, 322.21, 322.14, 322.15, 318, 269; 137/197, 199, 198, 860; 267/64.15–64.26, 64.28, 8 R; 92/86

[56] References Cited

U.S. PATENT DOCUMENTS

| | | | |
|---|---|---|---|
| 1,749,128 | 3/1930 | Buss | 137/198 |
| 2,155,978 | 4/1939 | Von Oberstadt | 188/269 |
| 2,182,034 | 12/1939 | Von Oberstadt | 188/322.17 |
| 2,635,715 | 4/1953 | Riedel et al. | 188/269 |
| 2,734,521 | 2/1956 | Hencken | 137/197 |
| 2,943,711 | 7/1960 | Rossman | 188/322.17 |
| 3,661,236 | 5/1972 | Wossner | 188/315 |
| 3,749,210 | 7/1973 | De Baan et al. | 188/315 X |
| 4,005,769 | 2/1977 | Itoh | 188/322.17 X |
| 4,166,523 | 9/1979 | Fujii et al. | 188/322.17 |
| 4,214,607 | 7/1980 | Bouteille | 137/860 X |
| 4,335,871 | 6/1982 | Mölders | 188/322.21 X |

FOREIGN PATENT DOCUMENTS 7619540 11/1976 Fed. Rep. of Germany .

Primary Examiner—Douglas C. Butler
Attorney, Agent, or Firm—Karl F. Ross; Herbert Dubno

[57] ABSTRACT

A hydropneumatic shock absorber comprises an outer tube centered on an upright axis, an inner tube coaxially spaced inside the outer tube and forming therewith an outer gas/liquid chamber, a piston rod inside the inner tube, generally coaxial with the tubes, and forming with the inner tube an inner liquid chamber, and a piston carried on the rod and radially outwardly engaging the inner tube, whereby axial displacement of the piston and rod relative to the tubes in one direction pressurizes the inner chamber. A foot valve between the inner and outer chambers permits limited liquid flow therebetween. An annular plug is fixed at the upper axial ends of the tubes and axially upwardly blocks the inner and outer chambers. A guide bushing in the plug surrounds the piston rod and an annular outer seal in the plug surrounds the piston rod above the bushing and forms with the bushing and plug an annular compartment surrounding the rod. The plug is formed with an inner passage having one end opening into the compartment and another end opening into the inner chamber and with an outer passage having one end opening into the compartment and another end opening into the outer chamber. A porous body is provided in the inner passage and a check valve in the outer passage permits flow only from the compartment into the outer chamber. An annular inner seal in the plug and surrounds the piston rod immediately below the bushing.

10 Claims, 2 Drawing Figures

TWO-TUBE HYDROPNEUMATIC SHOCK ABSORBER

FIELD OF THE INVENTION

The present invention relates to a hydropneumatic shock absorber of the two-tube type. More particularly this invention concerns such a shock absorber used on a motor-vehicle front-wheel axle.

BACKGROUND OF THE INVENTION

Two-tube shock absorbers are known, as for example from my earlier patent 3,749,210 as well as from U.S. Pat. Nos. 2,943,711, 3,661,236, and 4,005,769 and German utility model No. 7,619,540. A standard such shock absorber has an outer tube centered on an upright axis and forming with an inner tube an outer gas/liquid chamber. A piston rod inside the inner tube forms therewith an inner liquid chamber that can be pressurized by axial displacement of this piston rod and of the piston attached to it that rides on the inner wall of the inner tube. A foot valve allows limited flow between the inner and outer chambers. The inner chamber is completely filled with liquid, and the outer chamber is partially filled with this liquid and has a pressurized head of air above the liquid.

Normally the piston rod passes out of the absorber through a guide-seal assembly that incorporates at least one hard synthetic-resin guide bushing and inner and outer soft seal rings that axially flank this bushing. The inner seal protects the outer seal against the high pressure reigning in the inner chamber as the piston moves axially up. The guide-seal assembly is formed with a passage communicating between a compartment formed between the inner and outer seals and the outer chamber. A check valve in the guide-seal assembly permits flow from the inner chamber to the outer chamber for bleeding air from the inner chamber.

The inner seal in an arrangement such as described in above-cited German utility model No. 7,619,540 is spaced axially down from the guide bushing, normally being provided in a further inner tube extending down from the guide-seal assembly. This inner seal normally lies below the liquid level in the outer chamber. As some lateral bending of the piston rod is common, this inner seal and the elements carrying it must normally be built to permit limited radial shifting. Such construction not only leads to premature wear for this inner seal, which must be able to resist high pressure, but also makes lubrication of the guide bushing and outer seal difficult.

OBJECTS OF THE INVENTION

It is therefore an object of the present invention to provide an improved hydropneumatic shock absorber.

Another object is the provision of such a hydropneumatic shock absorber which overcomes the above-given disadvantages.

Yet another object is to provide a two-tube hydropneumatic shock absorber wherein better sealing and guiding of the piston rod is obtained.

A further object is the provision of a better gas-bleeding system in a hydropneumatic shock absorber.

SUMMARY OF THE INVENTION

These objects are attained according to the instant invention in a hydropneumatic shock absorber comprising, as is known in the art, an outer tube centered on an upright axis, an inner tube coaxially spaced inside the outer tube and forming therewith an outer gas/liquid chamber, a piston rod inside the inner tube, generally coaxial with the tubes, and forming with the inner tube an inner liquid chamber, and a piston carried on the rod and radially outwardly engaging the inner tube, whereby axial displacement of the piston and rod relative to the tubes in one direction pressurizes the inner chamber. A foot valve between the inner and outer chambers and permits limited liquid flow therebetween. A body of liquid fills the inner chamber and partially fills the outer chamber. An annular plug is fixed at the upper axial ends of the tubes and axially upwardly blocks the inner and outer chambers. A guide bushing in the plug surrounds the piston rod and an annular outer seal in the plug surrounds the piston rod above the bushing and forms with the bushing and plug an annular compartment surrounding the rod. According to this invention, the plug is formed with an inner passage having one end opening into the compartment and another end opening into the inner chamber and with an outer passage having one end opening into the compartment and another end opening into the outer chamber. A porous body is provided in the inner passage and a check valve in the outer passage permits flow only from the compartment into the outer chamber. An annular inner seal in the plug and surrounds the piston rod immediately below the bushing.

With the above-described system the compartment is always filled with oil, so that the outer seal as well as the guide bushing are continuously lubricated, thereby improving the sealing performance of the outer seal as well as the guiding performance of the bushing. Since the inner seal is directly beneath the guide bushing in the plug assembly it need not be set up to compensate for lateral bending or other displacement of the piston rod. Furthermore since the inner seal is not axially shiftable so it can act as a check valve it can seal much more tightly at the high pressures it will be exposed to.

According to another feature of this invention, means is provided on the plug forming a restriction at the one end of the inner passage. This means therefore controls the bleeding through the porous body to keep it at the desired low level that will not affect shock-absorber performance. A plate secured to the plug and formed with at least one aperture forming the restriction can constitute this means.

The plug according to this invention comprises a plug body formed with the passages, carrying the inner seal, bushing, and plate, a cover carrying the outer seal, and defining the compartment with the plate, and spacers in the compartment between the plug body and cover. These spacers may be bumps formed on the cover and axially downwardly engaging the plate. Such construction is extremely compact and simple so that the piston can have a stroke equal almost to the overall length of the tubes.

The outer passage according to this invention is formed between the plug body and the outer tube. To this end the check valve is formed by an O-ring radially outwardly defining the compartment and engaged axially between the plug body and the cover. Once again, such construction is extremely simple and compact.

The porous body according to this invention is annular and formed of a sintered metal or ceramic. The plate lies over the porous body and is secured to the plug body. A sufficiently fine pore size is chosen that only gas can pass through the porous body to keep the compartment full of oil even when the system is at rest.

According to another feature of this invention the plug is formed with a ridge projecting axially downward between the inner and outer tubes. The inner passage extends downward in the ridge and its the other end opens immediately adjacent the inner seal. Such positioning of the other end of the inner passage prevents any gas bubbles from forming and remaining against the inner seal, so that it remains wet with oil at all times.

The bushing is formed of a hard low-friction material and the seals are formed of a softer elastomer. The inner seal may be biased radially inwardly by an O-ring to keep its seal lip in tight contact with the piston rod.

DESCRIPTION OF THE DRAWINGS

The above and other features and advantages will become more readily apparent from the following, reference being made to the accompanying drawings.

SPECIFIC DESCRIPTION

Figure 1:
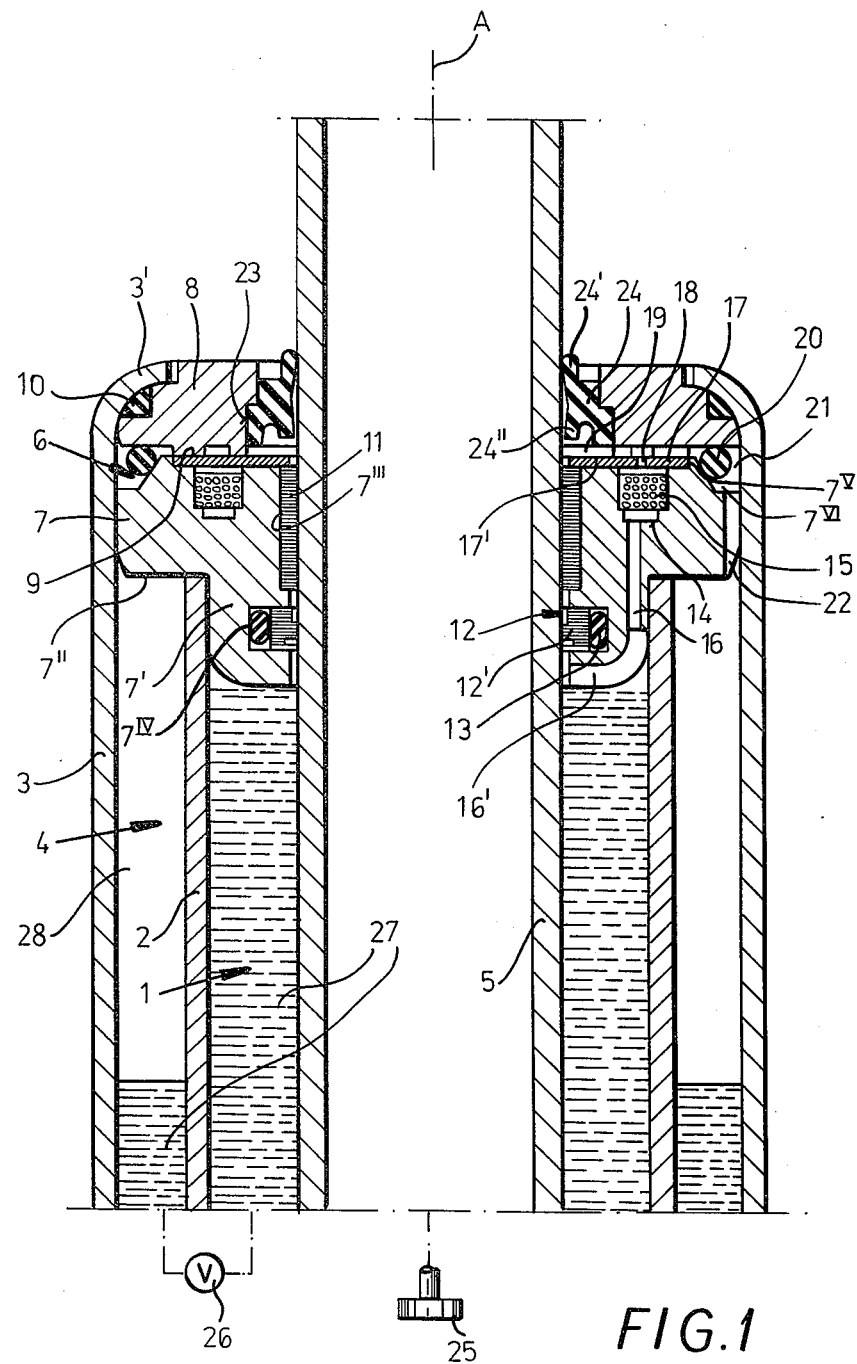
FIG. 1 shows in axial section a portion of a shock absorber according to the instant invention.
Figure 2:
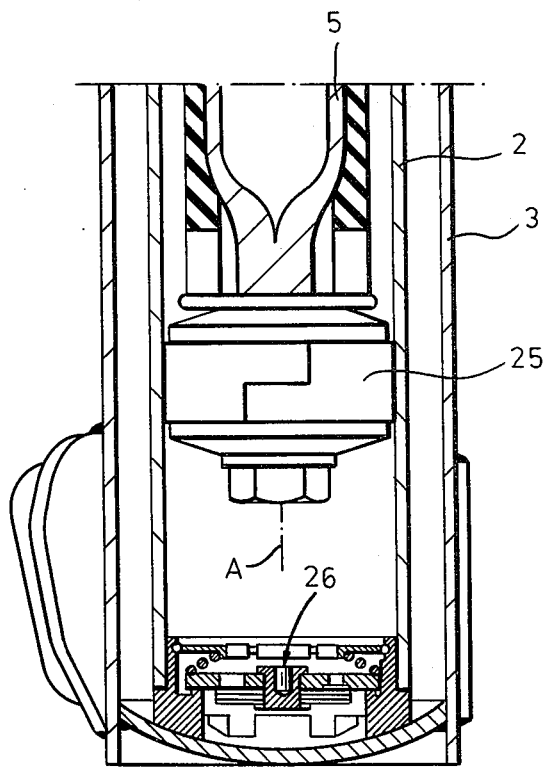
FIG. 2 shows a foot valve and piston of the instant invention.

As seen in the drawings a shock absorber centered on an axis A has an inner tube 2 defining with a central tubular piston rod 5 an inner liquid chamber 1 and an outer tube 3 defining with the innter tube 2 an outer liquid/gas chamber 4. A piston 25 carried on the tubular piston rod 5 can move axially in the chamber 1, radially outwardly engaging the inner wall of the tube 2, and a foot valve 26 allows limited liquid flow between the chambers 2 and 4. A body 27 of liquid completely fills the inner chamber 1 and partially fills the outer chamber 4, with a head 28 of air above the liquid in the outer chamber 4.

An end plug assembly 6 axially closes the upper ends of the chambers 1 and 4 and is formed by a plug body 7 and a cover 8 spaced apart by bumps 9 formed on the cover 8. A seal 10 prevents leakage between the outer periphery of the cover 8 and the upper end 3' of the outer tube 3.

The plug body is formed with an axially downwardly projecting annular ridge 7' fitted between the tubular piston rod 5 and the inner tube 2 and with a shoulder 7" extending perpendicular to the axis A and flatly abutting the upper end of the tube 2. In addition this body 7 is formed with a radially inwardly open groove 7''' receiving a cylindrically tubular guide bushing 11 of a hard synthetic resin such as polytetrafluorethylene. This bushing 11 snugly engages the piston rod 5 and guides it as it moves axially. The body 7 is further formed below the groove 7''' with a radially inwardly open rectangular-section groove $7^{iv}$ receiving a soft elastomeric seal 12 having a lip 12' radially inwardly engaging the piston rod 5. An O-ring 13 is compressed between the outer periphery of this inner seal 12 and the base of the groove $7^{iv}$, and serves to bias it radially inwardly.

The upper surface of the body 7 is provided with a metal washer or plate 17 formed with an annular array of small apertures 18 and received in an axially upwardly open groove $7^v$. The plate 17 has an inner periphery 17' spaced slightly radially outward from the rod 5 but extending radially inwardly enough to radially overlap the bushing 11 and retain it in place. Underneath the apertures 18 the upper surface of the body 7 is formed with an axially upwardly open stepped groove 14 receiving a porous ring 15 of sintered metal. This groove 14 constitutes one end of a passage 16 extending axially through the body 7 and having another end 16' opening immediately adjacent the inner seal 12. Thus any gas bubbles at this location will pass up through the passage 16 and through the body 15.

The spacers 9, which are formed as bumps on the cover 8 and that axially engage the plate 17, make an annular and radially inwardly open compartment 19 between the two parts 7 and 8 of the plug assembly 6. The cover 8 itself is formed with a radially inwardly open groove receiving a soft elastomeric outer seal 24 having outer and inner lips 24' and 24" which radially inwardly engage the piston rod 5, so that this outer seal 24 defines with the cover 8 the outer axial side of the compartment 19.

The plug body 7 is formed with a frustoconically beveled-off upper outer corner surface $7^{vi}$ forming with the cover 8 a compartment or annular space 21 receiving an O-ring 20 that normally engages sealingly against the cover 8 and against the body 7 to prevent liquid flow between the compartments 19 and 21. Axial passages 22 extend between the compartment 21 and the outer chamber 4.

This O-ring 20 acts as a check valve. If the pressure in the compartment 21 exceeds that in the compartment 19, the O-ring 20 will wedge between the body 7 and cover 8 and will effectively prevent liquid flow from the compartment 21 into the compartment 19. On the other hand, if the pressure in the compartment 19 exceeds that in the compartment 21, the O-ring 20 will expand slightly, normally lifting off the surface $7^{vi}$, and will allow fluid to move radially out past it from the compartment 19 to the compartment 21.

As the piston 25 moves axially upward the chamber 1 is pressurized above the piston 25. The seal 12 normally prevents any leakage between itself and the rod 5, but any gas bubbles in the top of the chamber 1 will move up in the passages 16 and through the body 15 and apertures 18 into the compartment 19. This gas will be vented past the check-valve O-ring 20 into the compartment 21 and thence through the passages 22 back into the outer chamber 4. Normally only the gas is thus vented past the O-ring 20, so that the compartment 19 remains filled with oil to lubricate the piston rod 5. The compartment 19 is maintained filled with oil by the inevitable small amount of leakage past the inner seal 12. Such oil is at worst, however, only under the comparatively low pressure of the outer chamber 4. The overall flow cross section of the apertures 18 determines just how much gas can pass into the compartment 19. The porous body 15 impedes flow of liquid back down into the chamber 1 enough to prevent the compartment 19 from every drying out.

Thus with the system according to the instant invention the chamber 1 is automatically bled of air as it is used. The bled air is automatically vented into the head 28 of air in the outer chamber 4. In addition the seals 12 and 24 are automatically kept wet, as is necessary for good sealing action.

We claim:
1. A hydropneumatic shock absorber comprising:
an outer tube centered on an upright axis;
an inner tube coaxially spaced inside said outer tube and forming therewith an outer gas/liquid chamber;

a piston rod inside said inner tube, generally coaxial with said tubes, and forming with said inner tube and inner liquid chamber;

a piston carried on said rod and radially outwardly engaging said inner tube, whereby axial displacement of said piston and rod relative to said tubes in one direction pressurizes said inner chamber;

a foot valve between said inner and outer chambers and permitting limited liquid flow therebetween;

a body of liquid filling said inner chamber and partially filling said outer chamber;

an annular plug fixed at the upper axial ends of said tubes and generally axially upwardly closing said inner and outer chambers;

a guide bushing in said plug and surrounding said piston rod;

an annular outer seal in said plug surrounding said piston rod above said bushing and forming with said bushing and plug an annular compartment surrounding said rod, said plug being formed with an inner passage having one end opening into said compartment and another end opening into said inner chamber and with an outer passage having one end opening into said compartment and another end opening into said outer chamber;

a porous body in said inner passage;

a check valve in said outer passage permitting flow only from said compartment into said outer chamber; and an annular inner seal in said plug and surrounding said piston rod immediately below said bushing.

2. The hydropneumatic shock absorber defined in claim 1, further comprising means on said plug forming a restriction at said one end of said inner passage.

3. The hydropneumatic shock absorber defined in claim 2 wherein said means is a plate secured to said plug and formed with at least one aperture forming said restriction.

4. The hydropneumatic shock absorber defined in claim 3 wherein said porous body is annular and sintered, said plate lying over said porous body and being secured to said plug body.

5. The hydropneumatic shock absorber defined in claim 4 wherein said porous body has pores so fine that gas can pass through it but said liquid cannot.

6. The hydropneumatic shock absorber defined in claim 1 wherein said outer passage is formed between said plug body and said outer tube, said check valve being formed by an O-ring radially outwardly defining said compartment and engaged axially between said plug body and said cover.

7. The hydropneumatic shock absorber defined in claim 1 wherein said plug is formed with a ridge projecting axially downward between said inner tube and piston rod, said inner passage extending downward in said ridge and its said other end opening immediately adjacent said inner seal.

8. The hydropneumatic shock absorber defined in claim 1 wherein said bushing is formed of a hard low-friction material and said seals are formed of a softer elastomer.

9. The hydropneumatic shock absorber defined in claim 8 wherein said inner seal has a lip engaging said rod and is provided with an elastic O-ring urging said lip radially against said rod.

10. A hydropneumatic shock absorber comprising:

an outer tube centered on an upright axis;

an inner tube coaxially spaced inside said outer tube and forming therewith an outer gas/liquid chamber;

a piston rod inside said inner tube, generally coaxial with said tubes, and forming with said inner tube an inner liquid chamber;

a piston carried on said rod and radially outwardly engaging said inner tube, whereby axial displacement of said piston and rod relative to said tubes in one direction pressurizes said inner chamber;

a foot valve between said inner and outer chambers and permitting limited liquid flow therebetween;

a body of liquid filling said inner chamber and partially filling said outer chamber;

an annular plug fixed at the upper axial ends of said tubes and generally axially upwardly closing said inner and outer chambers;

a guide bushing in said plug and surrounding said piston rod;

an annular outer seal in said plug surrounding said piston rod above said bushing and forming with said bushing and plug an annular compartment surrounding said rod, said plug being formed with an inner passage having one end opening into said compartment and another end opening into said inner chamber and with an outer passage having one end opening into said compartment and another end opening into said outer chamber;

means on said plug forming a restriction at said one end of said inner passage and including a plate secured to said plug and formed with at least one aperture forming said restriction;

a porous body in said inner passage;

a check valve in said outer passage permitting flow only from said compartment into said outer chamber; and an annular inner seal in said plug and surrounding said piston rod immediately below said bushing, said plug having a plug body formed with said passages, carrying said inner seal, bushing, and plate, a cover carrying said outer seal, and defining said compartment with said plate, and spacers in said compartment between said plug body and cover.

* * * * *